UNITED STATES PATENT OFFICE.

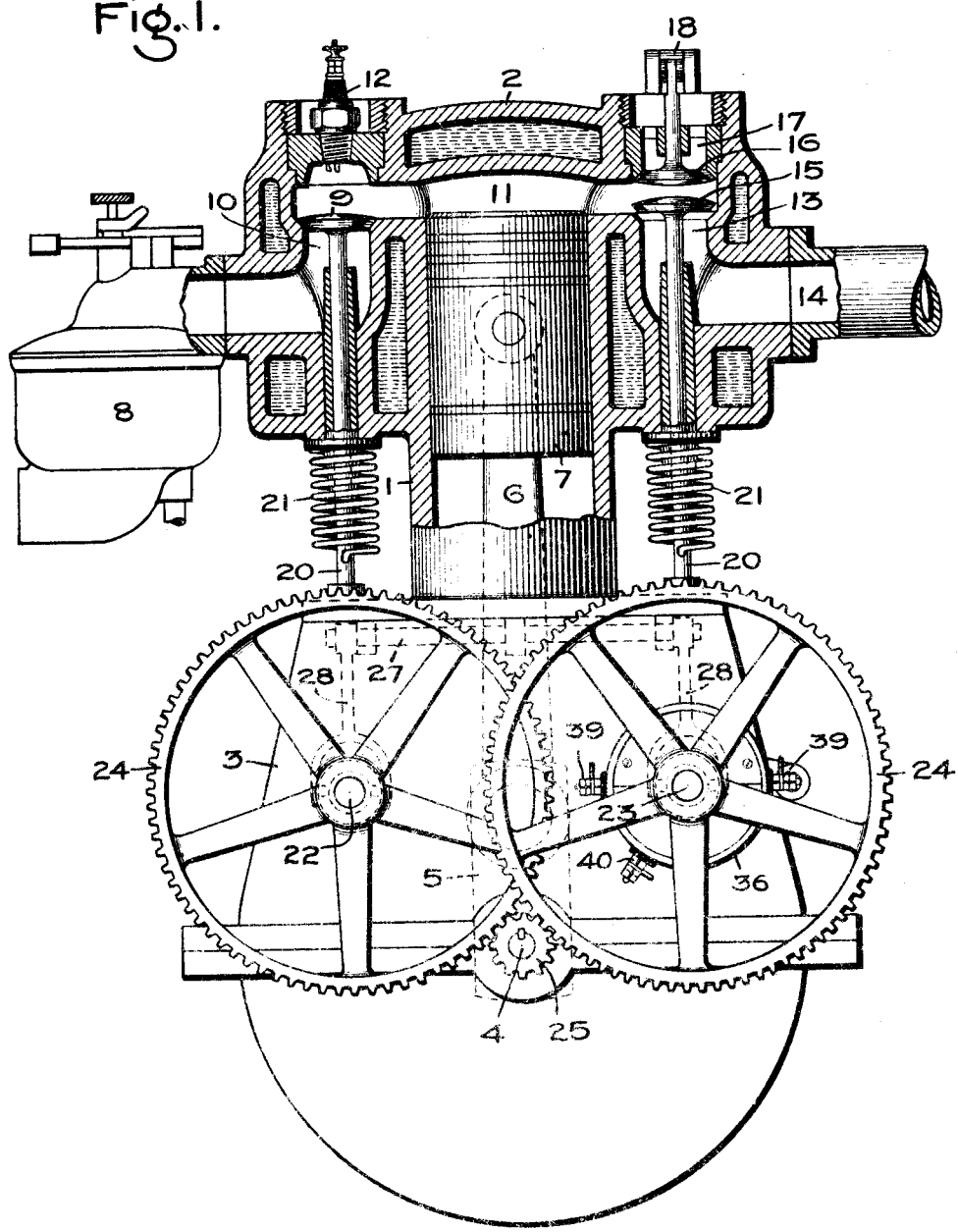

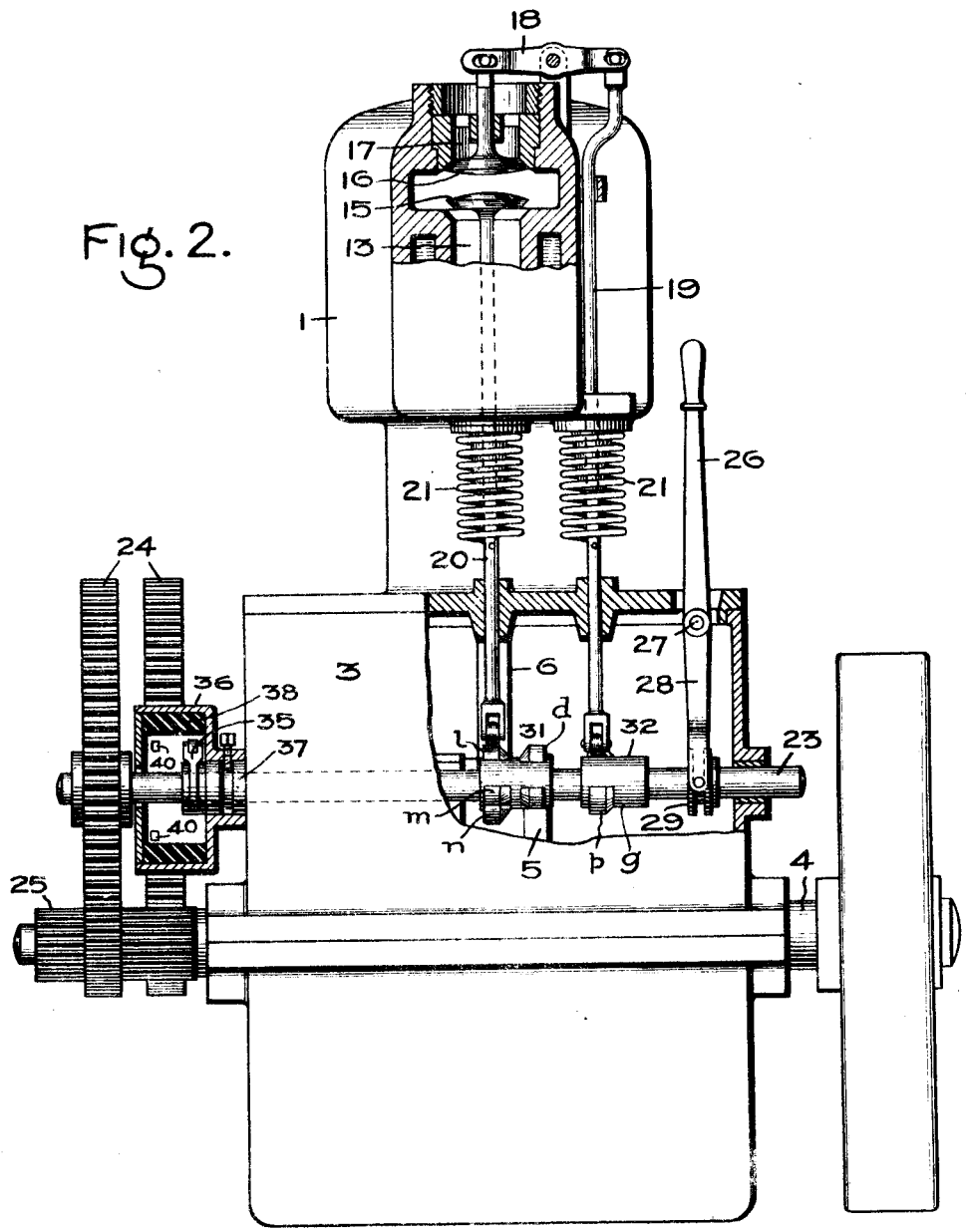

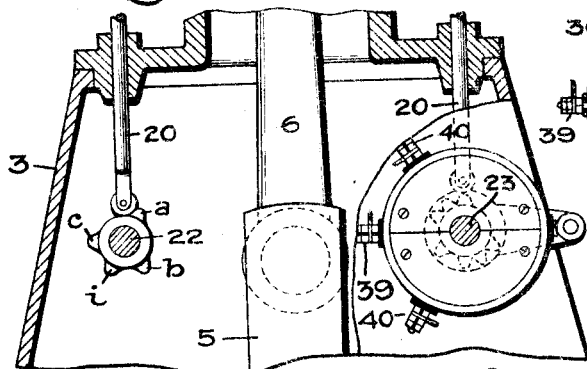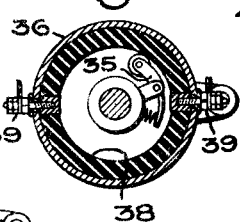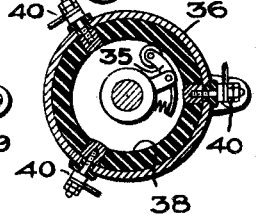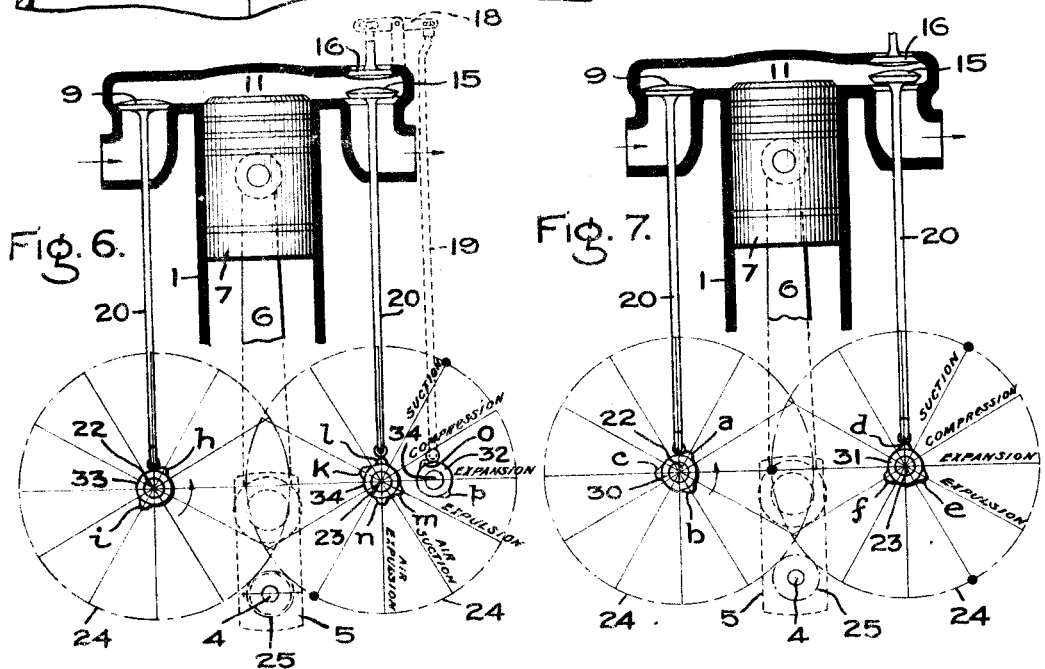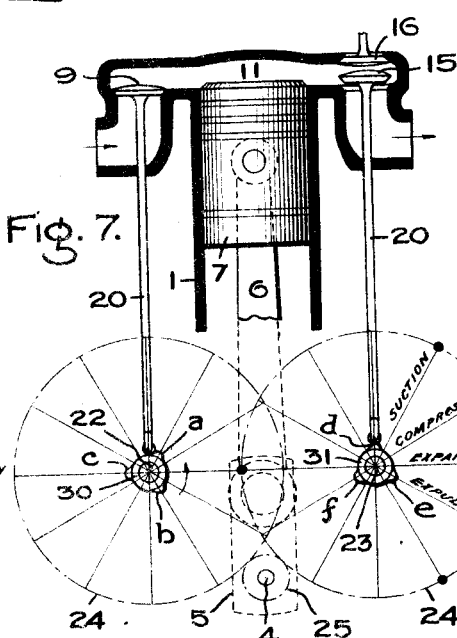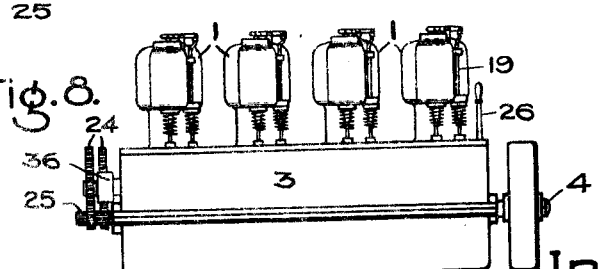

WILLIAM H. PRATT, OF LYNN, MASSACHUSETTS, ASSIGNOR TO GENERAL ELECTRIC COMPANY, A CORPORATION OF NEW YORK.

INTERNAL-COMBUSTION ENGINE 1,091,703.   Specification of Letters Patent.   Patented Mar. 31, 1914.

Application filed September 28, 1910. Serial No. 584,217.

*To all whom it may concern:*

Be it known that I, WILLIAM H. PRATT, a citizen of the United States, residing at Lynn, county of Essex, State of Massachusetts, have invented certain new and useful Improvements in Internal-Combustion Engines, of which the following is a specification.

This invention relates to gas or gasolene engines and its object is to provide an engine of the internal combustion class which can be operated either as a four-stroke cycle or a six-stroke cycle engine, the change from one type to the other being possible while the engine is running. The purpose of this construction is to secure a wider range of economical load for such a motor than is possible by the ordinary method of construction or control.

The motor hereinafter described can be operated on the four-stroke-cycle from full load down to sixty- or even fifty per cent. of full load, while as a six-stroke-cycle engine it can operate from about seventy per cent. of full load down. A motor of this construction will give much higher efficiencies on loads below one-half than the ordinary four-stroke-cycle motor, owing to the diminution in the amount of fuel consumed per revolution, and to the much better scavenging of the cylinder attainable by the six-stroke-cycle. This is apparent at a glance, upon comparison of the two cycles, as given below.

| Four-stroke-cycle. | Six-stroke-cycle. |
|---|---|
| 1st stroke—suction of charge | suction of charge. |
| 2nd " compression | compression. |
| 3rd " expansion | expansion. |
| 4th " expulsion of exhaust | expulsion of exhaust. |
| 5th " | suction of scavenging air. |
| 6th " | expulsion of same. |

It is evident that in the six-stroke-cycle, the volume of fresh air sucked in after the exhaust stroke and then expelled not only leaves the cylinder free from all burned gases, which would dilute the new charge, but also cools the cylinder so that the new charge is not heated to so high a temperature by the cylinder walls. The cooler the charge, the better is the efficiency.

In the accompanying drawings, Figure 1 is an end elevation partly in section, of a single-cylinder gas motor embodying my improvements. Fig. 2 is a side elevation of the same, partly in section. Fig. 3 is a section showing the cam shafts and the timer. Figs. 4 and 5 are sections of the timer on different planes transverse to its axis. Fig. 6 is a diagram showing the motor operating as a six-stroke-cycle engine. Fig. 7 is a diagram showing it operating as a four-stroke-cycle engine, and Fig. 8 is a side elevation of a four-cylinder engine embodying my invention.

The invention may be carried out in a variety of ways, but for the purpose of illustration, I have shown an upright engine having a single cylinder 1, provided with a water jacket 2 and mounted on a crank case 3 which affords journal bearings for a shaft 4 having a crank 5 connected by a rod 6 with the piston 7 in said cylinder. A carbureter 8 furnishes the explosive mixture which is admitted by a valve 9 through an inlet port 10 to the compression chamber 11 at the top of the cylinder, where the compressed charge is ignited by the spark plug 12. A port 13 leads out of the chamber 11 to the exhaust pipe 14, the escape of the burned gases being controlled by a valve 15. In addition to these inlet and exhaust valves, which are commonly found in all four-stroke-cycle engines, I have added a third valve 16 controlling a port 17 adapted to connect the chamber 11 with the atmosphere. This valve is operated preferably by a short lever 18, Fig. 2, and a rod 19. The stems 20 of the valves 9 and 15, together with the rod 19, are provided with springs 21 which operate to hold said valves closed, except as they may be positively opened at the proper times by cams. It is preferable to use two cam shafts 22 and 23, Fig. 3. On each shaft is a spur gear 24 meshing with a pinion 25 on the crank shaft. In the engine illustrated, the cam shafts are located so near each other, for the sake of compactness, that the gears 24 overlap, as shown in Fig. 1. The pinion 25 is quite long, so that the cam shafts can be shifted longitudinally without disengaging the gears from said pinion. The shifting of the cam shafts is for the purpose of bringing into operative position one or the other of two sets of cams, one set being arranged to operate the engine on the four-stroke-cycle, and the other set on the six-stroke-cycle. The shifting is effected by a hand lever 26 secured to a rock shaft 27 and projecting up through a slot in the top of the crank-case. The rock-shaft has two rock arms 28 bifurcated at their lower ends to engage with grooved collars 29 on the cam shafts. When the lever is actuated, the shafts will be slid lengthwise in their journal bearings. The gears 24 make one revolution for every six revolutions of the crank shaft. In the diagrams Figs. 6 and 7 they rotate counterclockwise. When running on the four-stroke-cycle (Fig. 7) the cam 30 on the shaft 22 for operating the admission valve 9 will have three equidistant swells $a\ b\ c$ and the cam 31 on the shaft 23 for operating the exhaust valve 15 also has three equidistant swells $d\ e\ f$, but these are set thirty degrees ahead of those on the cam 30, as clearly appears in Fig. 7. The two valves will thus be actuated in proper order and at the proper intervals, three times for every revolution of the spur gears, or in other words, once for every two revolutions of the crank shaft. When operating four-stroke-cycle, the air inlet valve 16 remains permanently closed, its stem resting on a cylindrical portion $g$ of the cam 32 on the shaft 23, Fig. 2.

In order to operate the engine on the six-stroke-cycle the cam shafts are shifted to the position shown in Fig. 2. A cam 33, Fig. 6, on the shaft 22 having two oppositely disposed swells $h\ i$ actuates the admission valve 9 twice in every revolution of the gears 24, that is to say, once for every three revolutions of the crank shaft. On the shaft 23 is a cam 34 having four swells $k\ l\ m\ n$ arranged in opposite pairs sixty degrees apart and thirty degrees in advance of the swells $h\ i$. This cam 34 controls the exhaust valve 15. On the cam 32 are two opposite swells $o\ p$ which open the air valve 16 after the swells $k\ m$ have effected the escape of the burned gases through the valve 15.

The timer or circuit closer for the ignition system includes an arm or contact 35 mounted on one of the cam shafts, as 23, and revolving inside of a casing 36 rotatably mounted on the bearing 37 concentric with the shaft 23. Inside the casing is a lining 38 of insulating material concentric with the shaft and on which said revolving contact bears. Two sets of stationary contacts 39 and 40 are mounted in said lining in different planes of revolution. When the cam shafts are in the position shown in Fig. 2, the two opposite contacts 39 coöperate with the revolving contact 35; but when the cam shafts are shifted to operate the engine on the four-stroke-cycle, the revolving contact is moved with the shaft 23 into line with the three equidistant contacts 40. All five contacts 39 and 40 are connected with the spark plug 12.

The operation has been pretty fully explained hereinbefore, but it may be briefly repeated as follows: The cam shafts 22 and 23 carry two sets of cams, and can be shifted longitudinally to bring either set into operative relation with the valve stems 19 and 20. One set of cams causes the engine to run on the four-stroke-cycle, and the other set on the six-stroke-cycle. In the latter case the air inlet valve 16 comes into play to admit a charge of fresh air to scavenge the cylinder 1 after the expulsion of the burned gases. When the change is made from four-stroke-cycle to six-stroke-cycle, the revolving contact 35 of the ignition system circuit breaker is automatically shifted to coöperate with a different set of stationary contacts to accord with the changed conditions. The casing 36 can be rotated on its bearing 37 to retard the spark.

In accordance with the provisions of the patent statutes, I have described the principle of operation of my invention together with the apparatus which I now consider to represent the best embodiment thereof; but I desire to have it understood that the apparatus shown is only illustrative and that the invention can be carried out by other means.

What I claim as new and desire to secure by Letters Patent of the United States is:—

1. An internal combustion engine having a piston and cylinder, valve gear and electric ignition mechanism for operating it on the four-stroke-cycle, additional valve gear and electric ignition mechanism which are put into coöperative action with the first named valve gear for operating it on the six-stroke-cycle, and means for changing the valve gear and ignition mechanism from one operating condition to the other.

2. An internal combustion engine having a piston and cylinder, valve gear and electric ignition mechanism for operating it on the four-stroke-cycle, additional valve gear and electric ignition mechanism which are put into coöperative action with the first named valve gear for operating it on the six-stroke-cycle, and a device which is common to both of said valve gears and to the electric ignition mechanisms for changing over their operation from one cycle to the other at will.

3. An internal combustion engine having a piston and cylinder, valves for the cylinder, rotatable cams for actuating a part of the valves when the engine is operating on the four-stroke-cycle, another set of cams for actuating all of the valves when the engine is operating on the six-stroke-cycle, shifting means for moving either set of cams into operative relation with the valves, an electrical ignition mechanism, and a device moved by the shifting means for varying the periods of activity of said ignition mechanism.

4. An internal combustion engine provided with an admission valve and an exhaust valve, a set of cams for operating said valves on the four-stroke-cycle, an air inlet valve, a set of cams for operating all three valves on the six-stroke-cycle, a timing device, and means for shifting the cams and device to change from one cycle to the other.

5. An internal combustion engine provided with an admission valve and an exhaust valve, a set of cams for operating said valves on the four-stroke-cycle, an air inlet valve, a set of cams for operating all three valves on the six-stroke-cycle, and means for shifting from one set of cams to the other at will.

6. An internal combustion engine provided with an admission valve and an exhaust valve, a set of cams for operating said valves on the four-stroke-cycle, an air inlet valve, a set of cams for operating all three valves on the six-stroke-cycle, means for shifting from one set of cams to the other at will, a revolving circuit breaker, and two different sets of contacts coöperating therewith in accordance with the cycle under which the engine is operating.

7. An internal combustion engine provided with an admission valve, an exhaust valve and an air valve, valve-operating mechanism including devices for operating the three valves on the six-stroke-cycle and devices for operating the first two valves on the four-stroke-cycle, means for bringing either set of devices into operation, and an ignition mechanism for the engine.

8. An internal combustion engine provided with an admission valve, an exhaust valve, and an air valve, cam mechanism for operating the three valves on the six-stroke-cycle when said mechanism is in a given position, means for shifting the cam mechanism to render the air valve inoperative and to operate the other valves on the four-stroke-cycle, and an ignition mechanism for the engine.

In witness whereof, I have hereunto set my hand this 22nd day of September, 1910.

WILLIAM H. PRATT.

Witnesses:
FRANK G. HATTIE,
CHARLES A. BARNARD.